United States Patent [19]

Silverman et al.

[11] Patent Number: 5,069,974

[45] Date of Patent: Dec. 3, 1991

[54] METALS COATED WITH PROTECTIVE COATINGS OF ANNEALED PERFLUORINATED CATION-EXCHANGE POLYMERS AND METHOD FOR MAKING SAME

[75] Inventors: David C. Silverman, Chesterfield, Mo.; Judith A. Lefelar, Somers, Conn.; Patrick J. Kinlen, High Ridge, Mo.

[73] Assignee: Monsanto Company, St. Louis, Mo.

[21] Appl. No.: 306,764

[22] Filed: Feb. 6, 1989

[51] Int. Cl.⁵ .............................................. B32B 15/08

[52] U.S. Cl. .................................... 428/422; 428/421; 428/463

[58] Field of Search ............... 428/370, 420, 213, 421, 428/422, 463; 427/44; 204/98, 1 T, 418, 252; 524/723, 795; 528/502; 526/250, 240, 243; 549/40

[56] References Cited

U.S. PATENT DOCUMENTS

| | | | |
|---|---|---|---|
| 2,393,967 | 2/1946 | Brubaker | 428/370 |
| 2,559,752 | 7/1951 | Berry | 524/723 |
| 2,593,583 | 4/1952 | Lontz | 528/502 |
| 3,041,317 | 6/1962 | Gibbs et al. | 526/243 |
| 3,282,875 | 11/1966 | Connolly et al. | 524/795 |
| 3,560,568 | 2/1971 | Resnick | 549/40 |
| 3,718,627 | 2/1971 | Grot | 526/240 |
| 3,770,547 | 11/1971 | Kelsey | 428/420 X |
| 3,784,399 | 1/1974 | Grot | 428/213 |
| 4,089,759 | 5/1978 | Krumpelt et al. | 204/98 |
| 4,115,209 | 9/1978 | Freiser et al. | 204/1 T |
| 4,391,844 | 7/1983 | Baczek et al. | 427/44 |
| 4,417,969 | 11/1983 | Ezzell et al. | 204/252 |
| 4,507,194 | 3/1985 | Shimomura et al. | 204/418 |
| 4,536,274 | 8/1985 | Papadakis et al. | 204/418 |
| 4,618,404 | 10/1986 | Pellegri | 204/98 |

FOREIGN PATENT DOCUMENTS

| | | |
|---|---|---|
| 06066369 | 12/1982 | European Pat. Off. . |
| 07079218 | 5/1983 | European Pat. Off. . |

OTHER PUBLICATIONS

D. C. Silverman and J. E. Carrico, "Electrochemical Impedance Techniqu-A Practical Tool for Corrision Prediction", Corrision-Nace, vol. 44, No. 5, May, 1988, pp. 280-287.

H. W. Starkweather, Jr., "Crystallinity in Perfluorosulfonic Acid Ionomers and Related Polymers" Macromolecules, vol. 15, No. 2, pp. 320-323, Mar.-Apr. 1982.

G. A. Olah et al., "Polymer Films on Electrodes. 4. Nalfion-Coated Electrodes and Electrogenerated Chemiluminescence of Surface-Attached RU(BPY)32+", Journal of the American Chemical Society, vol. 102, pp. 6641-6642 (1980).

C. R. Martin et al., "Dissolution of Perfluorinated Ion Containing Polymers" Analytical Chemistry, vol. 54, No. 9, pp. 1639-1641, Aug. 1982.

C. R. Martin et al., "Effect of Hydrophobic Interactions on the Rates of Ionic Diffussion in Nafion Films at Electrode Surfaces", J. Electroanal. Chem., vol. 159, pp. 127-135 (1983).

M. N. Szentirmay et al., "Ion-Exchange Selectivity of Nafion Films on Electrode Surfaces", Analytical Chemistry, vol. 56, No. 11, pp. 1898-1902, Sep. 1984.

I. Sekerka et al., "Reference Electrode Based on Perfluorosulfonic Acid Membranes", Analytical Letters, vol. 15(A7), pp. 611-619 (1982).

A. Bettelheim et al., "A New Polymer Ag/AgCl Reference Electrode for Electrochemistry with No Contacting Electrolyte Solution", J. Electrochem. Soc., Apr. 1988, pp. 1041-1042.

R. B. Moore et al., "Procedure for Preparing Solution-Cast Perfluorosulfonate Ionomer Films and Membranes", Anal. Chem., vol. 58, pp. 2569-2570 (1986).

G. Gebel et al., "Structure and Related Properties of Solution-Cast Perfluorosulfonated Ionomer Films", Macromolecules, vol. 20, No. 6, pp. 1425-1428 (1987).

*Primary Examiner*—Thomas J. Herbert, Jr.

*Attorney, Agent, or Firm*—Lawrence L. Limpus

[57] ABSTRACT

A passive metal is coated with a perfluorocarbon copolymer cation-exchange polymer and subsequently annealed. The annealed polymer coating acts as a barrier to anions which attack and breakdown the passivity mechanism of such passive metals, thereby protecting the passive metals against localized corrosion, such as crevice or piting corrosion, caused by anionic attack.

3 Claims, 8 Drawing Sheets

METALS COATED WITH PROTECTIVE COATINGS OF ANNEALED PERFLUORINATED CATION-EXCHANGE POLYMERS AND METHOD FOR MAKING SAME

FIELD OF THE INVENTION

This invention relates to protective coatings, and more particularly, to metals coated with protective coatings of perfluorinated cation-exchange polymers and to a method for making same.

BACKGROUND OF THE INVENTION

Protective coatings for materials exposed to corrosive, hostile, or chemically interfering environments have primarily been of the type that provide an impervious barrier to all components of the environment to which such coated materials are exposed. The substrate materials include, for example, metals, metal oxides, and polymers of various types. A particular disadvantage of such protective coatings arises when the coatings are no longer impervious. Additionally, the compatibility of the coating and the respective substrate may be lacking in that the coating fails to adhere to the substrate either immediately upon application thereto or upon ceasing to be impervious.

Thus, there exists a need for a protective coating which does not rely on being totally impervious to the environment into which the substrate is placed and which adheres well to the substrate upon which it is applied. Furthermore, there exists a need for a protective coating for passive metals and alloys containing same which are subject to localized corrosion via anionic attack.

SUMMARY OF THE INVENTION

Accordingly, a feature of the present invention is to provide a protective coating on a substrate which does not rely on being a totally impervious barrier to the environment in order to protect the substrate.

Another feature of the present invention is to provide a protective coating which tends to adopt a morphology compatible with its substrate when the coating is annealed so as to improve adhesion thereto.

Yet another feature of the present invention is to provide a protective coating for a metal substrate which prevents or at least substantially retards the rate of crevice or pitting corrosion of the metal substrate, wherein the metal utilized in such a substrate is susceptible to such types of corrosion via anionic attack.

More particularly, there is provided a protective coatingk on a metal substrate, the protective coating comprising a coating of a perfluorocarbon copolymer over the metal substrate wherein the coating has been annealed so as to effect the morphological change therein such that the rejection of hostile or interfering anions by the copolymer is improved wherein such hostile or interfering anions have a causal relationship with respect to promoting crevice or pitting corrosion of the metal utilized in the substrate by breaking down the passivity thereof.

The perfluorocarbon copolymer utilized herein is preferably an acid or salt derivative of a base copolymer comprising at least two monomers wherein one monomer is selected from a group consisting of a vinyl fluoride, hexafluoropropylene, chlorotrifluoroethylene, perfluoro-(alkyl vinyl ether) and tetrafluoroethylene, and the second monomer is selected from the group of monomers containing an $-SO_2F$ or $-COF$ group. The base copolymer is then converted an acid derivative thereof or a salt of this acid derivative. For example, the base copolymer may be converted to the acid or salt derivative thereof by hydrolyzing the base copolymer.

Metals which are susceptible to crevice or pit corrosion as a result of anionic attack include, but are not limited to, metals such as aluminum, nickel, iron, chromium, and alloys containing one or more of these metals. Stainless steels are an example of such alloys. Such metals and alloys containing same are usually referred to as passive metals.

Preferably, the protective coating is obtained by the method comprising:

(a) applying a solution containing at least one perfluorocarbon copolymer on a metal substrate to form a wet copolymer coating thereon;

(b) drying the wet copolymer coating so as not to disturb the molecular configuration of the copolymer, preferably heat drying at a temperature from about room temperature to about 120° C. for about 30 to 90 minutes;

(c) heat treating the dried copolymer coating at a temperature and for a time duration effective for changing the molecular configuration of the copolymer to a molecular configuration which enhances the rejection of hostile or interfering anions by the copolymer, preferably at a temperature of about 150° C. to about 250° C. and more preferably about 180° C. to about 230° C. for a time duration of at least about 15 minutes, preferably from about 15 minutes to about 11 hours and more preferably from about 30 minutes to about 2 hours; and (d) cooling the heat treated copolymer coating and the substrate to room temperature so as to avoid contraction and cracking or rapid crystallization of the heat treated copolymer coating, preferably over a time period of at least about 15 minutes, preferably from about 30 minutes to about 6 hours and more preferably from about 4 hours to about 6 hours, thereby forming the protective coating on the metal substrate.

Accordingly, these and other features and advantages of the present invention will become apparent from the following detailed description, wherein reference is made to the figures in the accompanying drawings.

BREIF DESCRIPTION OF THE DRAWINGS

DESCRIPTION OF THE INVENTION

Figure 1:
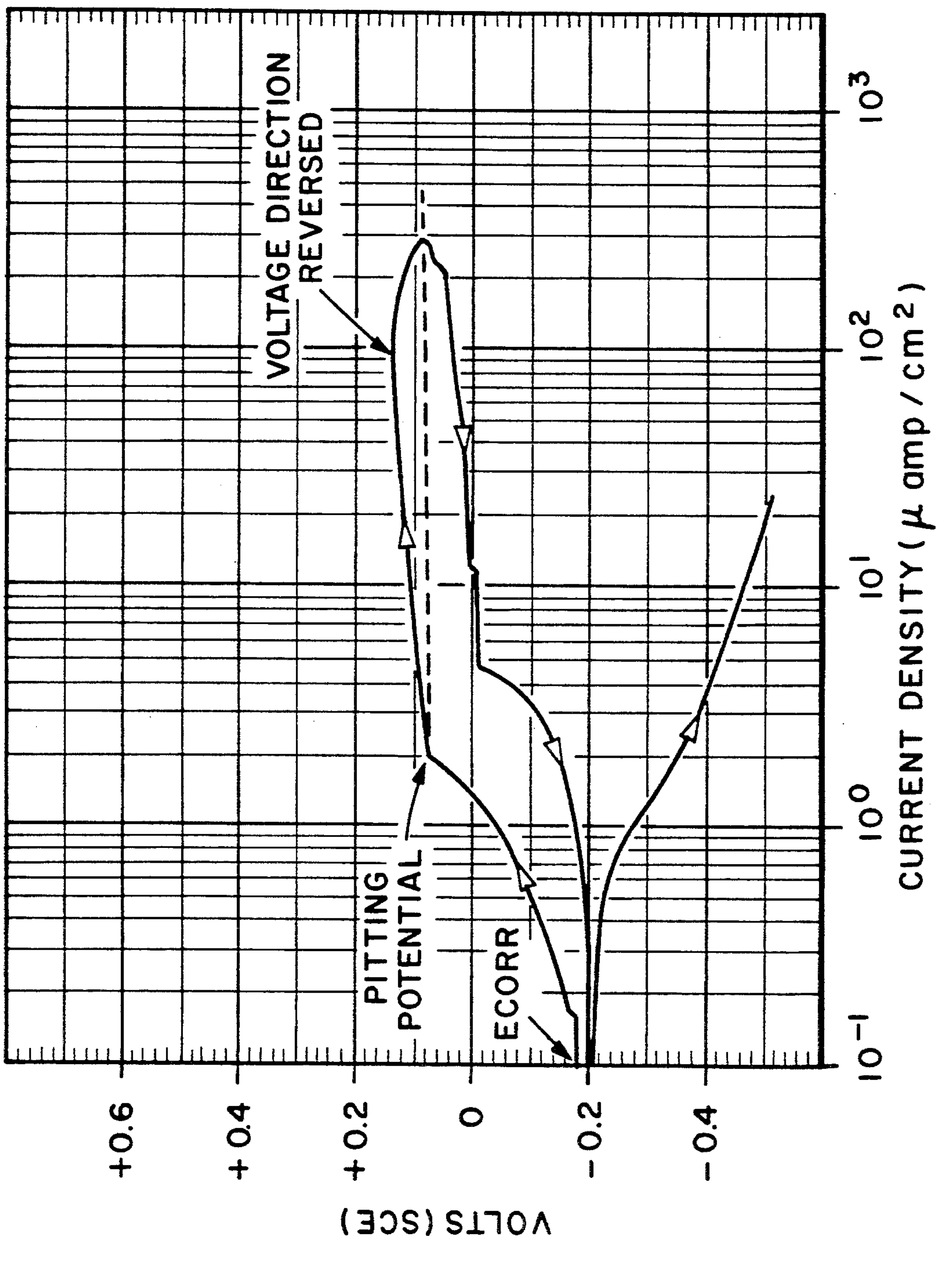
FIG. 1 is a cyclic polarization scan on a bare 316ss coupon.

The protective coatings of the present invention are particularly useful in protecting substrates containing passive metals which are susceptible to crevice or pit corrosion via anionic attack. The anions attack the substrates breaking down the passive properties of such metals. Examples of such metals, though not intended to be an exhaustive list thereof, are aluminum, iron, nickel, chromium, and metal alloys containing at least one such passive metal. Aluminum, aluminum alloys and chromium containing alloys are of particular interest. Example of the latter are stainless steels, nickel-based alloys and cobalt-based alloys (e.g., cobalt-based alloys sold under the mark "STELLITE" by Haynes International, Kokomo, Ind.). It is further believed that some measure of general corrosion protection may be afforded if the substrate is anodized prior to coating the substrate with the protective coating of the present invention.

Examples of anions typically encountered in hostile, corrosive environments wherein the protective coating would be useful include, but are not limited to, chloride, bromide, fluoride, perchlorate, thiocyanate, nitrate and nitrite ions.

The protective coating of the present invention is permselective in that it is a barrier to anions passing therethrough. However, water and hydrogen ions and other cations are freely allowed to pass therethrough provided there is an external driving force therefor. As such, the protective coating has limited applicability as an inhibitor of cationically activated corrosion (e.g., hydrogen ion attack). Thus, the protective coating hereof protects the metal substrate from anionic attack, and the metal substrate properties must be relied upon to protect same from cationic attack, e.g., hydrogen ion attack, resulting in general and/or localized corrosion. For example, 316 stainless steel resisted general and localized attack in an environment having a pH of 3 with the protective coating hereof protecting the metal substrate against anionic attack, and the metal alloy itself resisting hydrogen ion attack. On the other hand, aluminum did not fare as well in a pH 3 environment due to general corrosion via hydrogen ion attack. Therefore, in acidic conditions (pH=1 to less than 5), the protective coating hereof provides protection to the metal substrate against anionic attack, but the metal must protect itself against cationic attack. In neutral and basic conditions (pH greater than and equal to 5, preferably 5 to about 11), where anionic attack predominates as the cause of corrosion, the protective coating affords the metal substrate protection against general and localized corrosion, particulary localized corrosion.

The perfluorocarbon copolymers utilized in the protective coating are cation-exchange polymers which act as a barrier to the migration of anions to or away from the coated substrate. Furthermore, the perfluorocarbon copolymers are preferably annealed so as to improve their permselectivity and adhesion to the substrate. By permselectivity it is intended the ability of the polymer to act as a barrier to anions and as a transport for cations.

The annealing procedure involves a heat treating step and a subsequent cooling step. The heat treating step effects a change in the molecular configuration of the copolymer to a molecular configuration which enhances the rejection of hostile or interfering anions by the copolymer. The cooling step is effected such that the molecular configuration attained in the heat treating step is preserved, particularly avoiding contraction and cracking or rapid crystalization of the annealed coating. The change is molecular configuration of the copolymer is detectable by wide-angle X-ray diffraction and manifests itself as a more highly ordered molecular configuration over the non-annealed copolymer coating.

The chemical inertness of the perfluorocarbon copolymers allows such copolymers to be placed in direct contact with the corrosive or hostile environment without being detrimentally affected itself. As such, the copolymer is able to maintain its integrity once coated onto the substrate. Furthermore, the permselectivity of these copolymers inhibits or eliminates the transport of anions to the substrate, thereby eliminating or minimizing the effects of such environments on the substrate itself. For without the influx of fresh anionic material to the substrate, the harmful effects of the anionic materials cannot be maintained so as to adversely affect the substrate itself. This is true even though the cations and the aqueous solution containing such materials are free to come in contact with the substrate surface. Thus, crevice or pitting corrosion and to a certain extent general corrosion of the metal substrate is inhibited or as least retarded.

Suitable perfluorocarbon copolymers comprise at least two monomers with one monomer being selected from a group including vinyl fluoride, hexafluoropropylene, vinylidene fluoride, trifluoroethylene, chlorotrifluoroethylene, perfluro(alkyl vinyl ether), tetrafluoroethylene and mixtures thereof.

The second monomer contains an $—SO_2F$ or $—COF$ group. Examples of such second monomers can be represented by the formula:

$$CF_2=CFR_1SO_2F \text{ or } CF_2=CFR_1COF$$

$R_1$ in generic formula is a bifunctional perfluorinated radical having from 1 to 25 carbon atoms. A preferred monomer has from 1 to 8 carbon atoms. One restraint upon the generic formula is a requirement for the presence of at least one fluorine atom at the carbon atom adjacent the $—SO_2F$ or $—COF$ group. The $R_1$ generic formula portion can be of any suitable or conventional configuration, but it has been found perferable that the vinyl radical comonomer join the $R_1$ group through an ether linkage.

Typical sulfonyl or carbonyl fluoride containing monomers are set forth in U.S. Pat. Nos. 3,282,875; 3,041,317; 3,560,568; 3,718,627, which are hereby incorporated by references and methods for preparation of intermediate perfluorocarbon copolymers are set forth in U.S. Pat. Nos. 3,041,317; 2,393,967; 2,559,752 and 2,593,583, which are hereby incorporated by reference.

The base copolymers are then converted to the perfluorocarbon copolymer utilized herein containing $SO_3M$ or $CO_2M$ groups via, for example, hydrolysis, wherein M is hydrogen, an alkali metal, an amine, an ammonium ion or salt, or an alkaline earth metal. The converted copolymer contains sulfonate or carboxylate group based ion exchange sites contained in side chains of the copolymer and attached to carbon atoms having at least one attached fluorine atom. Not all sulfonyl or carbonyl groups within the base copolymer need be converted. The conversion may be accomplished in any suitable or customary manner such as is shown in U.S. Pat. Nos. 3,770,547 and 3,784,399, which are hereby incorporated by reference.

Suitable perfluorocarbon copolymers are commercially available from E. I. duPont under the trademark Nafion ®.

The perfluorocarbon copolymer coating is applied as a solution so as to completely cover the portion of the metal substrate to be exposed to the environment. The copolymer coating is then dried. The coating and drying process may be repeated as required to produce a coating which acts as a barrier against the migration of anions to or from the metal substrate's surface. The coating may be applied by methods, such as spraying, vacuum deposition, dipping or spin-coating. Finally, the copolymer coating is annealed, i.e., heat treated and cooled.

As earlier noted, the morphology (molecular configuration) of the perfluorocarbon copolymer of this coating is changed to one which is more highly ordered as evidenced by wide-angle X-ray defraction. The more highly ordered copolymer contains functional groups, i.e., carbonyl(—CO—) or sulfonyl (—$SO_2$—) groups, that are more closely spaced than the unchanged or unannealed polymer, thereby providing an enhanced functional group domain structure. As such, the changed copolymer possesses better permselectivity than the unchanged polymer. The annealed polymer also possesses enhanced adhesion and lower solubility.

Various methods for effecting a change in the morphology of such copolymers are disclosed by R. B. Moore, III and C. R. Martin, "Procedure for Preparing Solution-Cast Perfluorosulfonated Ionomer Films and Membranes," Anal. Chem., 1986, Vol. 58, pages 2569–70; G. Gebel, P. Aldebert, and M. Pineri, "Structure and Related Properties of Solution-Cast Perfluorosulfonated Ionomer Films," Macro-molecules, 1987, Vol. 20, pages 1425–1428; U.S. Pat. No. 4,089,759 (Krumpelt et al.; for free-standing membranes); and U.S. Patent Application S/N 917,201, filed Oct. 14, 1986, entitled "Solid State Indicator Electrode and Method for Making Same," which is assigned to the same assignee as this invention; which are hereby incorporated by reference. Moore et al. and Gebel et al. utilize a low boiling point/high boiling point co-solvent and correspondingly two stages of heat treating. However, care should be exercised when utilizing this method in that the properties and behavior of such films are strongly dependent upon the procedure used, i.e., upon the counter ions of the perfluorocarbon copolymer (acid or salt), the presence and the type of additional polar solvents, and the thermal history thereof.

The preferred procedure is the procedure disclosed in U.S. Patent Application Ser. No. 918,201, which may at first glance be perceived as an adaptation of Krumpelt et al. process to solution-cast films. However, it is noteworthy that the annealed coating of U.S. Patent Application Ser. No. 918,201 does not form the same morphology as the annealed free-standing membranes of Krumpelt et al. As evidenced by wide-angle X-ray diffraction of the two annealed materials. Additionally, the morphology of an annealed coating on a metal substrate is different from either of the foregoing. The difference is believed to be surface effects of the material onto which the copolymer is coated. The annealed membrances exhibited one-dimensional crystallinity having a hexagonal packing of polymer chains. On the other hand, the annealed coatings adopt a morphology which is dependent upon and more compatible with the substrate to which it is applied and enhances the adhesion thereof to the substrate. For example, on metal and metal oxide substrates the annealed coatings exhibited two-dimensional crystallinity wherein the chains are regularly packed hexagonally and have interchain alignment. In such cases, the sulfonate or carboxylate groups of the copolymer appear to be involved in a reaction or strong interaction with the substrate, thereby enhancing adhesion thereto and suggesting a basis for the change in the morphology of the copolymer. On non-polar polymer substrates, the annealed coatings exhibit one-dimensional crystallinity wherein it is believed that the non-polar backbone portion of the perfluorocarbon copolymer coats the surface, thereby enhancing the compatibility and adhesion thereof to the substrate.

More uniform properties and behavior of the annealed polymer coating are obtained by this preferred procedure which utilized low boiling point solvents such as water and lower alkyl (up to C5) alcohols and ethers or mixtures thereof, which may be evaporated at less than 120° C., preferably between about room temperature and about 120° C. Once the applied copolymer coating is dried onto the substrate, the copolymer coating is annealed, that is, heat treated at a temperature and for a time duration to effect the desired morphological transformation of the copolymer in the copolymer coating, such as the heat treatment procedure Krumpelt et al. utilized in heat treating their membranes.

In a preferred embodiment, the substrate is coated by dipping into a solution of about 5% to about 15% by weight of Nafion ® perfluorocarbon copolymer of 1100 equivalent weight in a low aliphatic (up to C5) alcohol and water. The copolymer coating is then dried by any appropriate means to remove the solvent, such as by heating, air drying at room temperature, or drying in a dessicator. If heating to dry, the temperature is preferably not raised above about 120° C. so as not to disturb the molecular configuration of the copolymer (that is, remains an unchanged or non-annealed copolymer). The preferred means of drying the copolymer coating is to heat the coated substrate in the range of about 80° C. to about 120° C. for about 30 minutes to about 90 minutes. The coating procedure is repeated, if necessary, until the substrate is entirely coated with a thin film of the perfluorocarbon copolymer. A preferred number of repetitions of the coating procedure is from one (i.e., the coating procedure is performed one time) to about five times, the most preferred number of repetitions being from about two to four times.

The perfluorocarbon copolymer coating is then annealed by heat treating the coated substrate to an effective temperature and for a time duration for effecting a change in the molecular configuration of the copolymer which enhances the rejection of anions and then cooling, preferably to room temperature, the heat treated copolymer coating. Although the mechanism of the molecular configuration and improved rejection of interferences caused by anion migration is not understood and not wishing to be bound to any particular theory, it is believed that the annealing of the copolymer coating produces a better defined functional group domain structure, that is, better phase separation between the functional group portion (or phase) and the non-functional group portion (or phase) of the copolymer, and a more highly ordered copolymer. Both these factors would likely contribute to the enhanced permselectivity of the annealed copolymer coating over the non-annealed copolymer coating.

The preferred method of annealed the copolymer coating involves heating the copolymer coated substrate in an oven initially at room temperature and slowly raising the oven temperature to a maximum temperature of about 250° C., preferably about 230° C. and more preferably about 210° C., for a period of time sufficient to effect the morphological reconfiguration of the copolymer. If the copolymer is subjected to a temperature in excess of about 280° C., degradation of the copolymer typically occurs. If the copolymer is subjected to a temperature of less than about 120° C. or is heated an insufficient amount of time, the morphological reconfiguration has not been observed to occur. A preferred temperature range for annealing the copolymer is from about 150° C. to about 250° C., more preferably from about 180° C. to about 230° C. The time duration for annealing the copolymer at an effective temperature is at least about 15 minutes, preferably from about 15 minutes to about 11 hours and more preferably from about 30 minutes to about 2 hours.

The coated substrate is then cooled by any conventional means which allows slow cooling, preferably down to room temperature. The cooling period is at least about 15 minutes, preferably from about 30 minutes to about 6 hours and more preferably about 4 hours to about 6 hours. A suitable method is by turning off the oven and allowing the coated substrate to cool slowly to room temperature in the oven over a period of about 30 to about 90 minutes. It is presently believed that if the coating is cooled too quickly the copolymer coating may not properly maintain the desired reconfigured morphology because too rapid a cooling may cause contraction and cracking or rapid crystallization of the copolymer coating.

The annealed coated substrate is then preferably hydrated by means such as soaking, heating or boiling in a liquid such as water, water solutions or buffer solutions or exposure to vapors thereof (e.g., steaming). Other water sources include water-saturated air and steam.

The following examples are for illustrative purposes only and are not meant to limit the claimed invention in any manner.

EXAMPLES

The following coated substrates were made according to the present invention.

Coupons of welded 316 stainless steel (316ss) and of aluminum were sand blasted after all sharp edges were removed by sanding. The coupons were then placed in a beaker of methyl dichloride ($CH_2Cl_2$) for about 10 minutes and then placed in a sonic bath for about 3 minutes. The coupons were then dried with nitrogen. Each coupon to be coated was then dipped into an about 10% by weight solution of 1100 EW (equivalent weight) Nafion® polymer which was concentrated from a 5% weight solution obtained from Aldrich Chemical Company. The coupons were then removed from the solution and as much of the excess Nafion® solution as possible was removed. The coupons were then dried in air at room temperature for about 30 minutes. The coupons were then dip coated a second time and allowed to air dry overnight.

The coated coupons were then treated with sodium hydroxide by placing the coupons in a beaker of 1N NaOH for about 15 minutes at room temperature. The sodium hydroxide treatment converted the acid functionality in the Nafion® coating to the corresponding sodium salt thereof and evolving water. The coupons were then rinsed under running distilled water for about 15 minutes and then air dried at room temperature yielding non-annealed coated coupons.

The non-annealed coupons were then annealed by heat treating in a vacuum oven at about 23 inches of $H_g$ vacuum under a slight nitrogen purge. During the heat treatment, the coupons were maintained at about 22° C. for about 30 minutes, then ramped to about 210° C. in about 45 minutes, and then held at about 210° C. for about 30 minutes. The annealing procedure then concluded with a slow cool down to room temperature over a period of about 5 to about 6 hours.

EXAMPLE 1

Metal Substrate: Stainless Steel

Coupons of 316ss were exposed to an aqueous solution of 1M NaCl, pH=3, at 50° C. for at least 28 days and at most 35 days. Except for coupon A, the coupons were pretreated by sand blasting. Coupons A, B and C were bare, i.e., not coated with a Nafion® coating. Coupons D, E and F were coated with a Nafion® coating, but not annealed. Coupons G, H and J were coated with a Nafion® coating and annealed. Crevice forming washers were used to simulate crevices. The result are detailed in Table 1.

TABLE 1

| Coupon | Coated | Annealed | Observed the Attack |
|---|---|---|---|
| A[b] (#86) | No[a] | — | Severe crevice corrosion. Some etch and stain on surface. Attack seems to be less than on bare, sand blasted surface. (Coupons B and C) |
| B[b] (#29) | No | — | Severe crevice corrosion. Possible general corrosion but difficult to differentiate from pock markings caused by sand blasting. |
| C[b] (#30) | No | — | Severe crevice corrosion. Possible general corrosion but difficult to differentiate from pock markings caused by sand blasting. |
| D[c] (#45) | Yes | No | Slight crevice corrosion in several areas below artificial crevices. Much of Nafion ® coating lifted. |
| E[c] (#55) | Yes | No | Slight crevice corrosion. Marks from artificial crevices observable with possible slight general corrosion. Much of the Nafion ® coating lifted. |
| F[c] (#80) | Yes | No | One pit under crevice washer. Much of the Nafion ® coating lifted. |
| G[b] (#26) | Yes | Yes | No crevice corrosion. A large deposit under coating in one area. Some general corrosion stains. |
| H[b] (#27) | Yes | Yes | No crevice corrosion. Some general corrosion stains. |
| J[b] (#28) | Yes | Yes | No crevice corrosion. Some general corrosion stains. |

[a]Not sand blasted
[b]Exposure period - 28 days
[c]Exposure period - 35 days

Use of non-annealed Nafion® polymer coatings seem to be able to decrease crevice corrosion relative to a bare coupon where the coating adheres to the surface. The problem observed is that the non-annealed coating has a tremendous difficulty adhering to the surface of the metal substrate. On the other hand, the annealed Nafion® copolymer coating seems to have no difficulty adhering to the 316ss surface. Furthermore, 316ss crevice corrosion did not occur under the artificial crevice washers when coated with annealed Nafion ® copolymer coating but some crevice corrosion was found under the artificial crevice washers when coated with non-annealed Nafion ® coatings.

In coupon G, the large deposit under the annealed Nafion ® coating is believed to be corrosion products trapped below the coating. No hemispherical pits were evident in this area. These results suggest that though localized attack could be initiated the attack ceased. The corrosion product, while raising the coating, could not break through the coating.

The anion (e.g., chloride ion) rejection property of the annealed Nafion ® copolymer coating may not be the only property that is preventing crevice corrosion. The ability to prevent such corrosion may be also arising from an increase ability of the annealed Nafion ® copolymer to maintain separation between two crevice forming surfaces so that oxygen diffusion is rapid enough to maintain passivity. Alternatively, the annealed form cannot lift from the surface in the crevice whereas the non-annealed form can and does lift from the surface. A plausible explanation may be an enhanced bonding via either a reaction or strong interaction between the functional groups of the copolymer and the metal substrate which may be more prevalent in the annealed versus unannealed forms of the copolymer.

Additionally, it is emphasized that the annealed perfluorocarbon copolymer coating (e.g., Nafion ® coating) is not a totally impermeable coating. Instead, it is permselective and is a barrier to anions. The coating allows neutral species (e.g., water) and cations (e.g, hydrogen ions) to pass therethrough. This coating protects passive metals and alloys including same which lose their passivity as the result of anionic attack, e.g., chloride ion attack. As noted in the observation of coupons G, H and J, general corrosion appeared to have caused some staining of the coupons, but no extensive or severe general corrosion was present. Furthermore, unlike impermeable coatings which present a capillary action when the substrate becomes exposed to a liquid and cause the impermeable coating to lift, the permeable coatings hereof allow water or neutral fluids to wet the substrate diffusing the capillary effect.

EXAMPLE 2

Metal Substrate: Stainless Steel

In this example, cyclic polarization scans were run on bare 316ss, non-annealed Nafion ® copolymer coated 316ss, and annealed Nafion ® copolymer coated 316ss coupons to examine the propensity for pit initiation. The goal is to further examine the previous immersion results of Example 1 that indicate that annealed Nafion ® copolymer coatings appear to significantly decrease crevice corrosion. The solution was 1M NaCl, pH=3, at 50° C., a medium highly conducive to localized attack of 316ss.

One of the methods to compare the tendency for a metal or an alloy to undergo localized corrosion is the cyclic polarization scan. In this procedure, the metal or alloy is allowed to establish a steady state corrosion potential. Twenty to twenty-four hours is usually adequate. Then a potential is scanned anodically (in the noble direction) to a current limit (usually about 100 uamp/cm$^2$). The direction of the scanner is reversed back to the corrosion potential and sometimes (as in this case) into the cathodic current region. The shape of the scan can be related to the propensity for localized corrosion (pitting and crevice corrosion) to occur. The characteristics that are used to estimate the propensity for localized corrosion are the appearance of a hysteresis in the voltage-current relationship and the position of the intersection with the ordinate upon reversal of the voltage scan direction. This procedure is an adaptation of ASTM G61-86 (Standard Test Method for Conducting Cyclic Potentiodyamic Polarization Measurements for Localized Corrosion Susceptibility of Iron-, Nickel-, or Cobalt-based Alloys).

Figure 2:
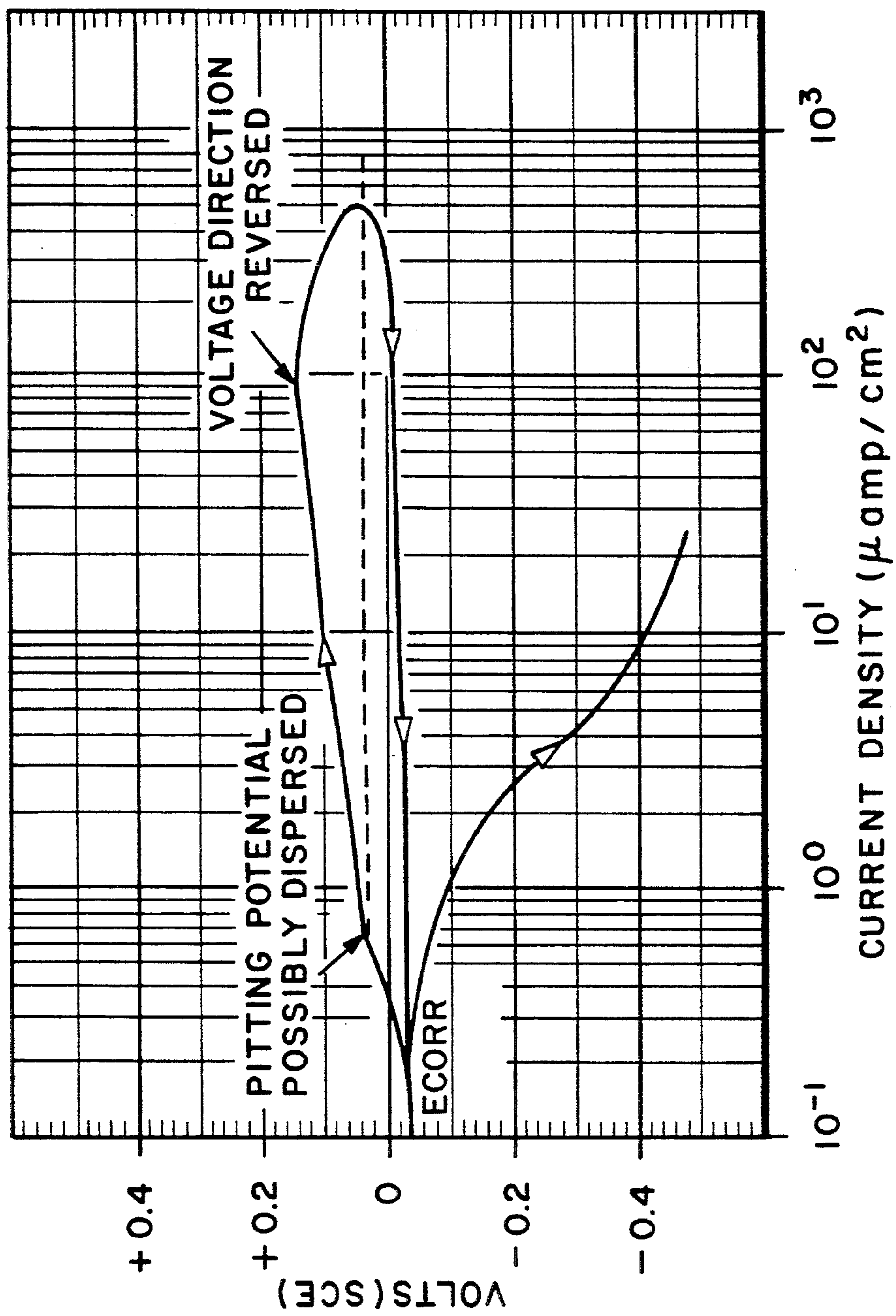
FIG. 2 is a cyclic polarization scan a non-annealed Nafion ® copolymer-coated 316ss coupon.
Figure 3:
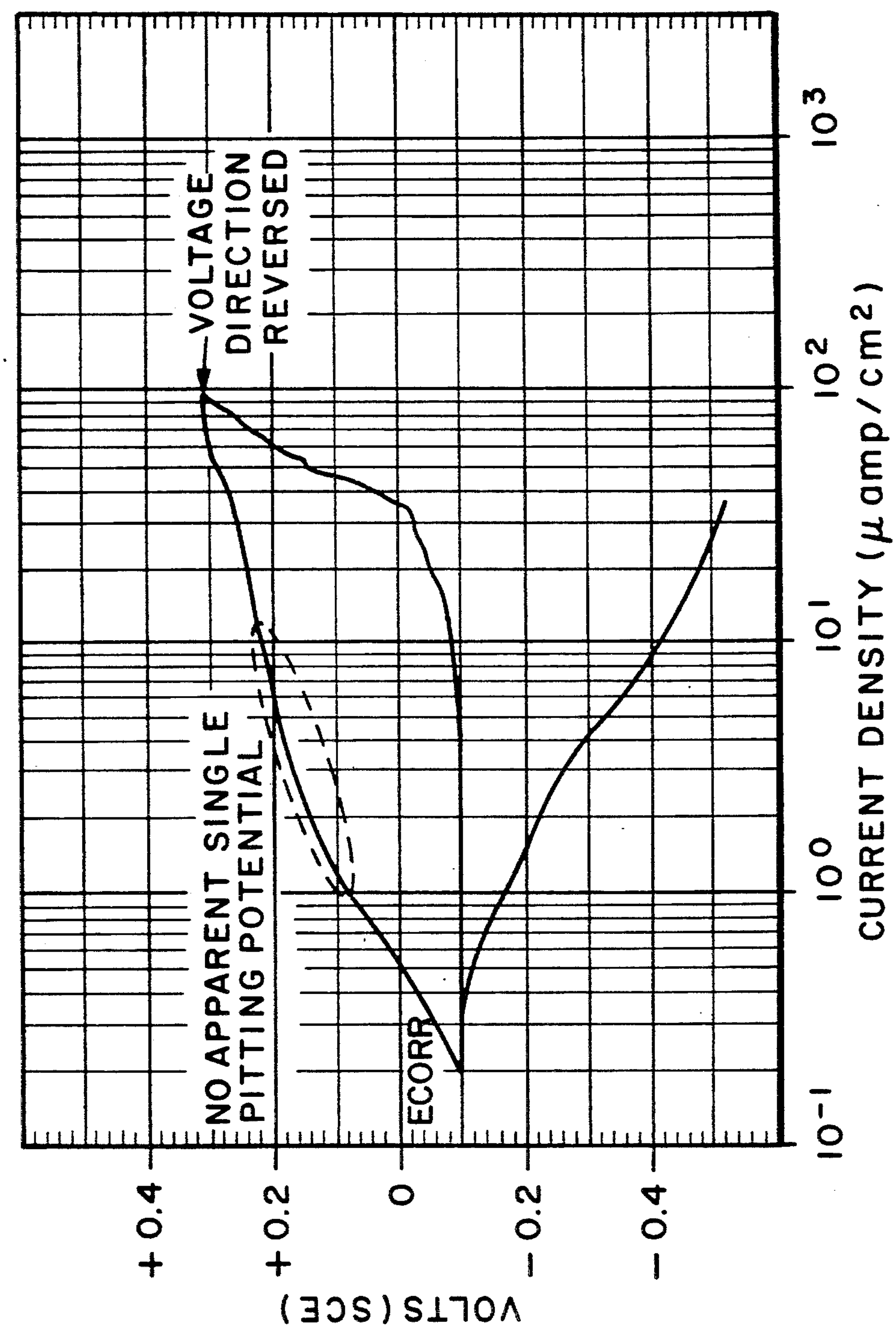
FIG. 3 is a cyclic polarization scan on an annealed Nafion ® copolymer-coated 316ss coupon.

FIGS. 1-3 show the polarization scans of three specimens of 316ss in 1M NaCl, pH=3, 50° C. The medium was chosen to guarantee localized attack (crevice corrosion via anionic attack) of 316ss. This medium was the same as that used in Example 1. The polarization scans were generated at 1.8 volt/hour. The three 316ss specimens were bare (FIG. 1), coated with non-annealed Nafion ® copolymer (FIG. 3).

Polarization scans from all three specimens showed a large hysteresis suggesting that localized attack can be initiated above the pitting potential (approximately 0.8 V vs. saturated calomel electrode (SCE) on the bare surface). However, the continued propagation of the pits was not the same for each specimen.

The bare 316ss specimen (FIG. 1) had a sharp pitting potential. Above the pitting potential, pits grew. Pitting continued after reversal of the scan direction as long as the pitting potential was exceeded (current continuing to increase above dashed line). This increasing current meant that pits were continuing to form because once started the current per pit should be fairly constant until the potential is decreased below the pitting potential. The hysteresis was large. The scan returned to the ordinate near the corrosion potential but active to the forward scan suggesting that some pits were continuing to grow even near the corrosion potential. This behavior was suggestive of crevice corrosion being possible. The coupon results of Example 1 showed such crevice corrosion in this medium.

The polarization scan of the non-annealed Nafion ® copolymer coated specimen in FIG. 2 was similar to that of the bare specimen. Two differences should be noted. The stable corrosion potential was about 150 mV more noble. The pitting potential was not as sharp but was still present. The change in corrosion potential was probably real. The direction of the change suggested some additional oxidation of the surface caused by the coating. The dispersion of the pitting potential may be caused by two effects. Differences in coating thickness may cause differences in electrical resistance (which manifests itself as a voltage drop or IR drop) across the coating with position. This non-uniformity could create a dispersion of the pitting potential. In addition, non-uniformity of the coating could result in local differences in the solution "seen" by the surface. Such differences could result in a dispersion of the pitting potential.

However, the major point was that the voltage-current behavior in FIG. 2 was very similar to that in FIG. 1. Pits would be expected to form above the pitting potential. Below the pitting potential, already formed pits would not immediately repassivate suggesting the possibility of crevice corrosion. Indeed, such attack was found in the coupon results of Example 1. In addition, pits did form in the alloy surface during the generation of the polarization scan manifesting themselves as darkened spots (pits not lumps) of metal that penetrated below the surface of the metal. Non-annealed Nafion ® coatings would not be expected to offer significant crevice corrosion protection over a bare surface.

The polarization scan of the annealed Nafion ® copolymer coated 316ss electrode in FIG. 3 shows some significant differences from the other two polarization scans. The pitting potential, if it did exist, was highly dispersed across at least one-half order and possibly one order of magnitude of current. The hysteresis was different. Upon scan reversal, the current immediately began to decrease meaning that the surface of the electrode was beginning to passivate immediately. This behavior was inconsistent with pit propagation. The response was unchanged even when the current at reversal was higher. This response suggests that if pits can be initiated (e.g. by extreme polarization, i.e., potentials far anodic to the pitting potential), they may be more easily passivated or their growth may be more easily extinguished.

After the second polarization scan of the annealed Nafion ® coated 316ss electrode, darkened areas developed as raised lumps on the surface of the electrode below the Nafion ® coating. The darkening was most likely caused by general corrosion products trapped below the coating. No hemispherical pits as large as those in the non-annealed Nafion ® copolymer coated 316ss electrode could be seen even at 64× magnification. Some very small pit-like structures were present but they were extremely shallow, suggesting that they were no longer growing even at high anodic current densities. These results indicate that though a pit could initiate above the pitting potential, the pit quickly stops growing. The general corrosion product, while raising the coating, could not break through it. Additionally, these general corrosion products changed the local environment on the electrode on the return portion of the polarization scan causing the observed hysteresis effect therein.

Figure 4:
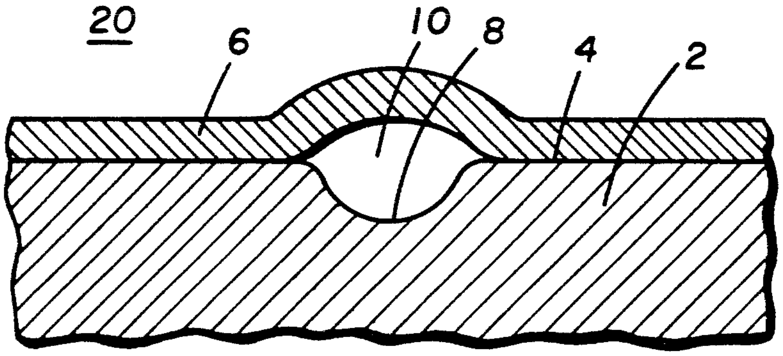
FIG. 4 is a pictorial representation of a pit on the surface of a 316ss coupon when a non-annealed Nafion ® coating is utilized.

FIG. 4 is a pictorial representation of a pit(8) on the surface (4) of the 316ss substrate (2) when a non-annealed perfluorocarbon copolymer (e.g., Nafion ® copolymer) coating (6) is utilized. The corrosion products (10) fill the pit (8). The corrosive solution (20) containing hostile anions is shown.

Figure 5:
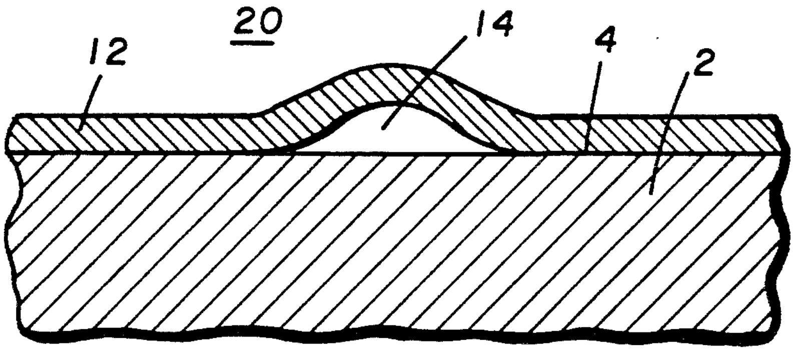
FIG. 5 is a pictorial representation of a 316ss coupon coated with an annealed Nafion ® coating with corrosion products trapped between the surface of the 316ss and the coating.

FIG. 5 is a pictorial representation of the surface (4) of the 316ss substrate (2) coated with an annealed perfluorocarbon copolymer (e.g., Nafion ® copolymer) coating (12) with corrosion products (14) trapped between the surface (4) and the annealed coating (12). Little or no penetration below the original surface (4) occurs when the annealed coating (12) is utilized.

Though not wishing to be bound by any particular theory, a reasonable explanation for the extinguishing of the pitting is as follows. Normally, when a pit initiates, it is accompanied by a current density in the range of 1 amp/cm$^2$. In the absence of significant fluid flow, a salt film can precipitate because the solution immediately adjacent to the surface can become super-saturated with the corrosion products. The rate of propagation may become limited by the rate of mass transfer of this film out of the pit under reduced or no flow conditions. When coated with annealed Nafion ® copolymer, the corrosion products cannot break through to the bulk solution. Mass transfer falls to zero so the products would continue to build up under the coating and pitting is shut down. One possible reason why these corrosion products shut down the pitting is that the increased corrosion mass creates a large IR drop to the base of the pit, decreasing the polarization of the pit base relative to the uncorroded surface. This mechanism is one explanation for why crevices stop growing.

The main conclusion is that the annealed coating definitely either prevents or significantly retards the localized (crevice or pitting) corrosion process, for example, the pitting that 316ss would undergo in a lower pH, chloride environment. This conclusion agrees with the coupon results of Example 1. An intact annealed Nafion ® coating appears to be strong enough to prevent breakthrough of corrosion products.

EXAMPLE 3

Metal Substrate: Stainless Steel

In this example, cyclic polarization scans and the electrochemical impedance technique were used to examine more closely the corrosion resistance imparted by the annealed Nafion ® coating on 316ss. The procedure was to identify the pitting potential on bare 316ss and then to polarized the annealed Nafion ® coated 316ss electrode above this potential and estimate the passivity of the alloys. Polarization scans were used to identify the pitting potential on bare 316ss. Electrochemical impedance spectra were generated under controlled potential conditions to determine if polarization of the annealed Nafion ® coated 316ss near and above this potential could cause breakdown of passivity. In this example, the solution utilized was 0.5M NaCl, pH of 7, at 30° C., a medium highly conducive to localize attack of 316ss.

The polarization scans were conducted as in Example 2 and the electrochemical impedance technique was conducted according to the article by D. C. Silverman and J. E. Carrico entitled "Electrochemical Impedance Technique—A Practice Tool for Corrosion Prediction", Corrosion-Nace, volume 44, no. 5, pp 280–297, May 1988, which is hereby incorporated by reference. The bare and annealed Nafion ® coated 316ss materials were prepared as in Example 2.

A polarization scan was run on the bare 316ss material in the pH 7 environment. The polarization scan indicated that the pitting potential lay at about 0.3 V (SCE, saturated calomel electrode). A pit was observed to form on the bare 316ss electrode used to generate the polarization scan. This result suggests that polarization to potentials anodic to 0.3 V should lead to pitting of the 316ss coupons.

Electrochemical impedance spectra were generated to establish that the annealed Nafion ® coated 316ss electrodes did not suffer such pitting after polarization above the pitting potential because the Nafion ® coating inhibited such pitting. The spectra were regenerated at the corrosion potential, 0.2 V(SCE), 0.3 V(SCE), 0.35 V(SCE), and 0.4 V(SCE). These results were fitted using a model of a simple parallel combination of a resistor and capacitor in series with a resistor. The single resistor corresponds to the uncompensated resistance (i.e., the solution and the coating). The resistor and the parallel combination corresponds to the polarization resistance which is inversely proportional to the corrosion rate. The calculated curves agreed very well with the measured frequency response which strongly suggests that the circuit can model the frequency response of this corrosion process. The polarization resistance values are listed in Table 2.

An estimate of the uncompensated resistance is important because if it is large, the measured potential could be greater than the actual potential. If so, control at what is though to be a potential above the pitting potential would actually be at a somewhat lower value. The uncompensated resistance is estimated by the high frequency intercept with the real axis when the results are plotted in a Nyquist format.

After plotting the results in a Nyquist format, the uncompensated resistances were all found to be about 5 ohm-cm$^2$. As such, the annealed Nafion ® coating did not increase the resistance. Additionally, the controlled potentials used to generate the electrochemical impedance spectra mentioned above would be similar to the slowly changing potentials used to generate the polarization scan for the bare 316ss electrode noted above. Thus, polarization above the pitting potential should result in the onset of localized corrosion at various locations on the 316ss electrode. Such attack would have led to a significant decrease in the polarization resistance compared to the values shown in Table 2, possibly to values in the range of 1,000 to 5,000 ohm-cm$^2$.

However, as shown in Table 2, the controlled potential at 0.35 V(SCE) resulted in polarization resistance value comparable to those at lower potentials. Even at 0.4 V (SCE), the polarization resistance only fell by a factor of two suggesting that though more anodic current is being generated the alloy is still passive. If the annealed Nafion ® coated 316ss behaved like bare 316ss, currents as high as 50 microamp/cm$^2$ might have been observed. This current density corresponds to a polarization resistance of 500 to 1,000 ohm-cm$^2$, far less than that observed. The conclusion is that the annealed Nafion ® coating has prevented localized attack from occurring at potentials anodic to the pitting potential. Since chloride ions were the only constituents that could initiate this type of attack in this situation, the Nafion ® coating as annealed must have rejected these ions.

TABLE 2

Polarization Resistance & Current Density As Function Of Voltage

| Potential (Volts(SCE)) | Polarization Resistance (ohm-cm2) |
|---|---|
| −.017[a] | 1204700. |
| −.006[a] | 1302200. |
| 0.20 | 2280300. |
| 0.30 | 971900. |
| 0.30 | 1480300. |
| 0.35 | 1320300. |
| 0.40 | 636200. |

[a]corrosion potential (Ecorr)

EXAMPLE 4

Metal Substrate: Aluminum

In this example, polarization scans and the electrochemical impedance technique were utilized to establish the anion (chloride) rejection properties of the annealed Nafion ® coating to reduce the propensity to localize attack of aluminum. Bare aluminum and aluminum coated with an annealed Nafion ® coating were examined in 0.5M NaCl at 35° C. in a nitrogen purge environment at pH values of 7 and 11. The cyclic polarization scans were performed as in Example 2 and the electrochemical impedance technique utilized was that of Example 3.

FIGS. 6–9 show the results of the polarization scans.

Figure 6:
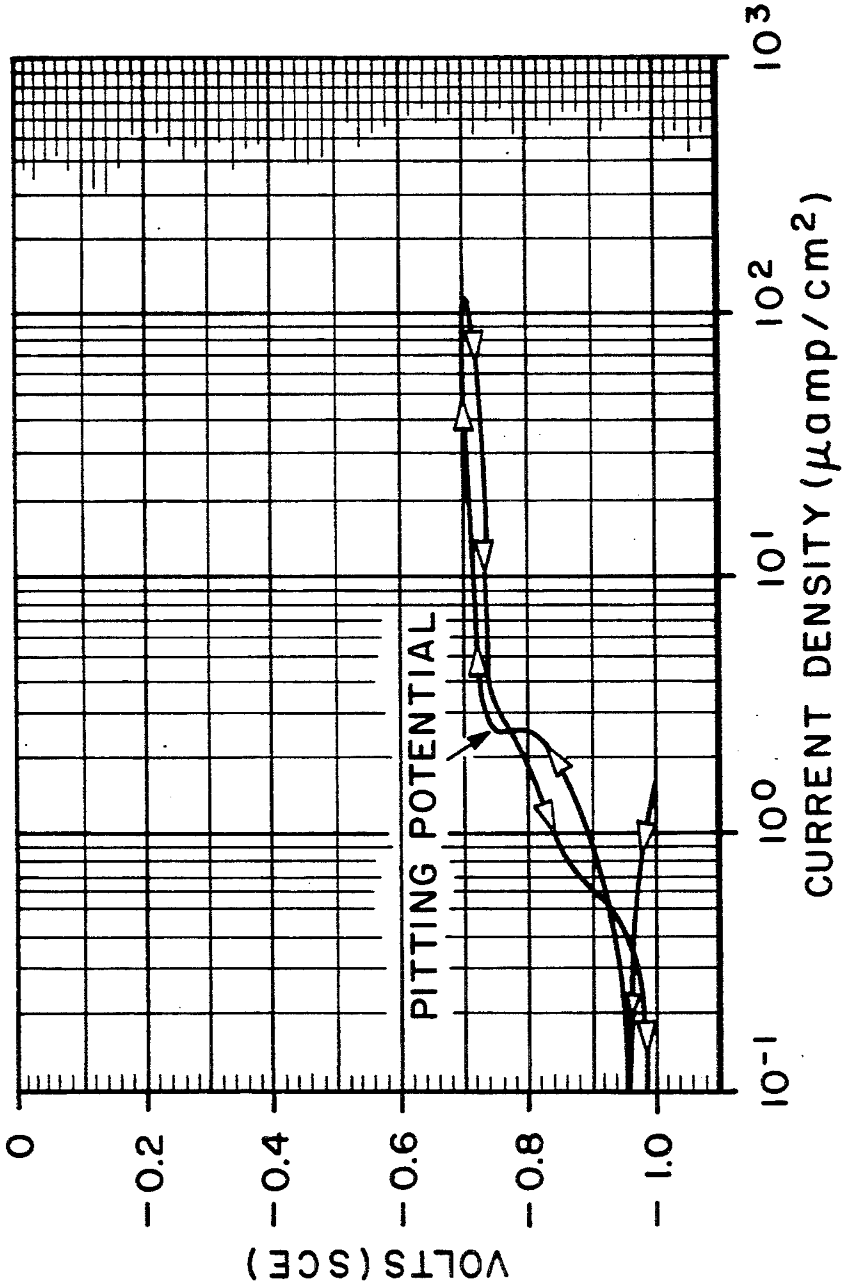
FIG. 6 is a cyclic polarization scan on a bare aluminum coupon, at a pH of 7.
Figure 7:
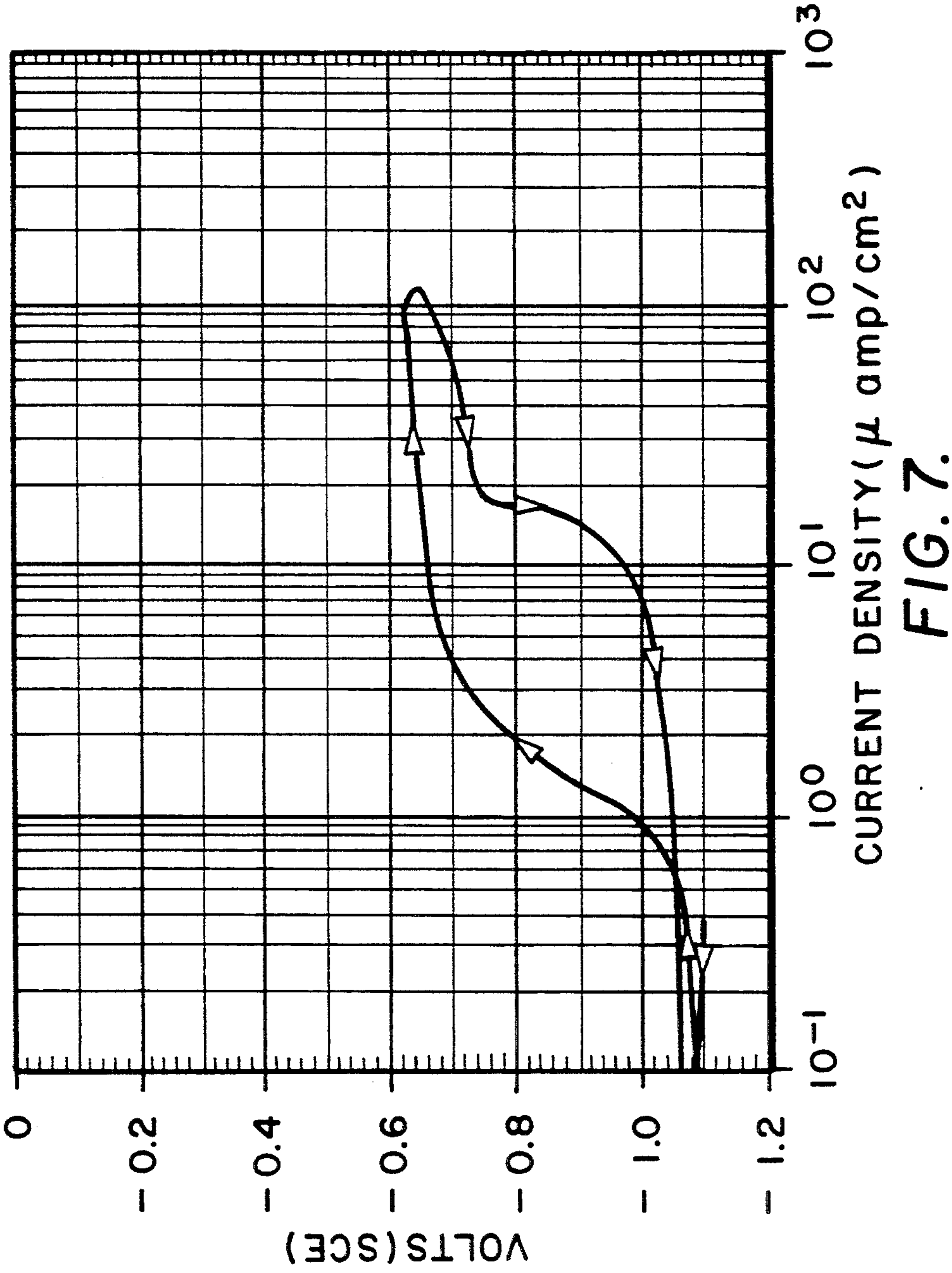
FIG. 7 is a cyclic polarization scan on an annealed Nafion ® coated aluminum coupon, at a pH of 7.

FIGS. 6 and 7 show the results for a pH of 7. A pitting potential was observed on the scan for the bare aluminum coupon, see FIG. 6. The presence of this pitting potential was confirmed by the passive region occurring just below it, the sharp break above it, and the presence of a hysteresis, i.e., the forward and reverse cans were different. FIG. 7 shows the results for an annealed Nafion ® coated electrode (aluminum coupon used as electrode) not pretreated in boiling water. A hysteresis was present (the reverse scan did not follow the forward scan). There was no sharp break in the current as the potential was increased. Though, a pitting potential may have been present and the hysteresis observed, the aluminum electrodes coated with an annealed Nafion ® coating did not show any localized attack after the scans were completed. However, the bare aluminum coupons did suffer localized attack. The pitting in aluminum was in the form of etch pits as opposed to hemispherical pits. As such, the conclusion was that the annealed Nafion ® coating prevented the etch pitting of aluminum at a pH of 7.

Figure 8:
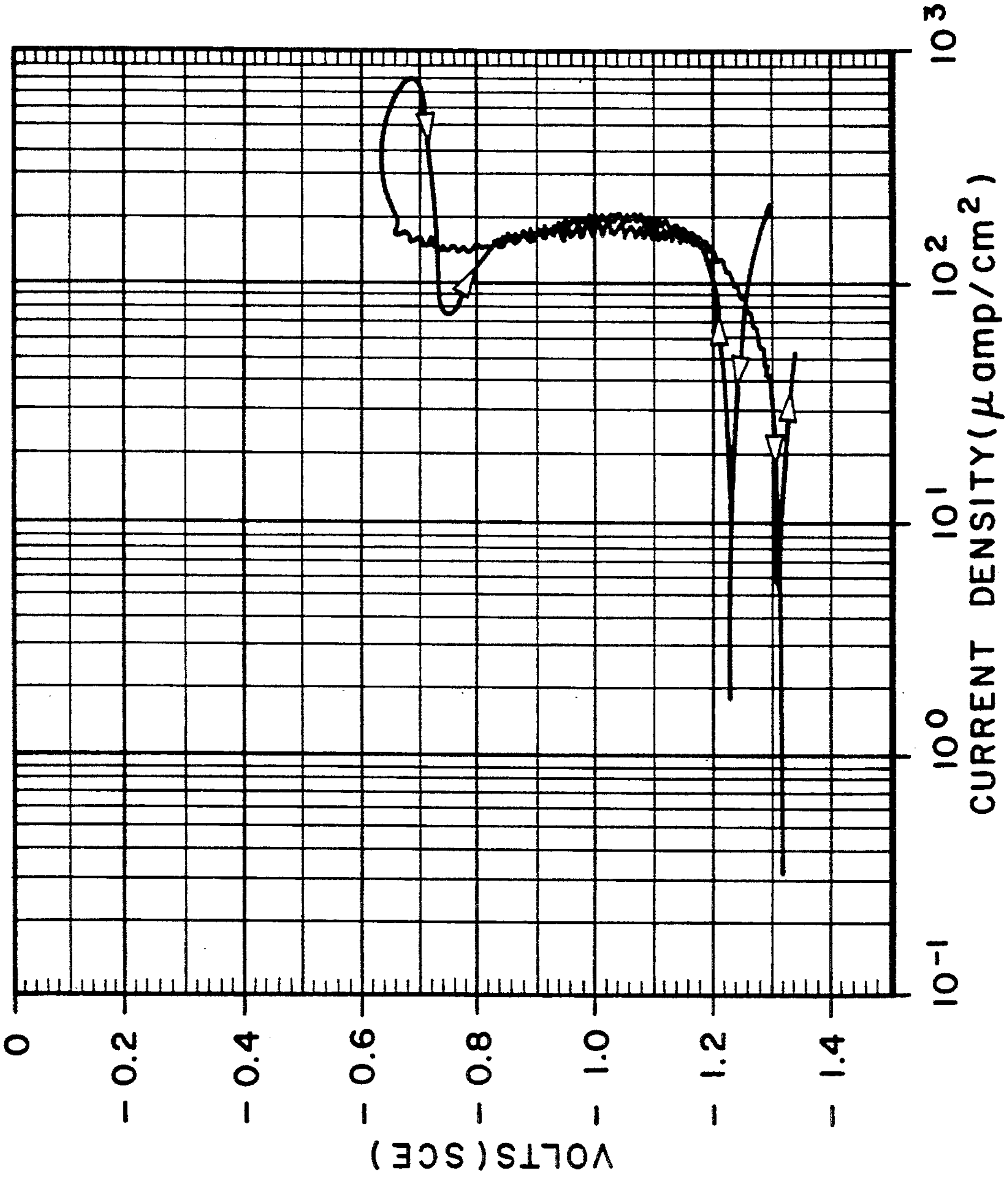
FIG. 8 is a cyclic polarization scan on a bare aluminum coupon, at a pH of 11.

In FIG. 8, there is shown the polarization scan for a bare aluminum coupon immersed in a solution having a pH of 11. There was a current limit at about 200 microamps/cm$^2$ which was likely a measure of the general corrosion rate of aluminum at this pH. The curve broke at about −0.65 volts (SCE) with a hysteresis in the return scan. The determination of the pitting potential was somewhat tenuous because of the large general corrosion rate.

Figure 9:
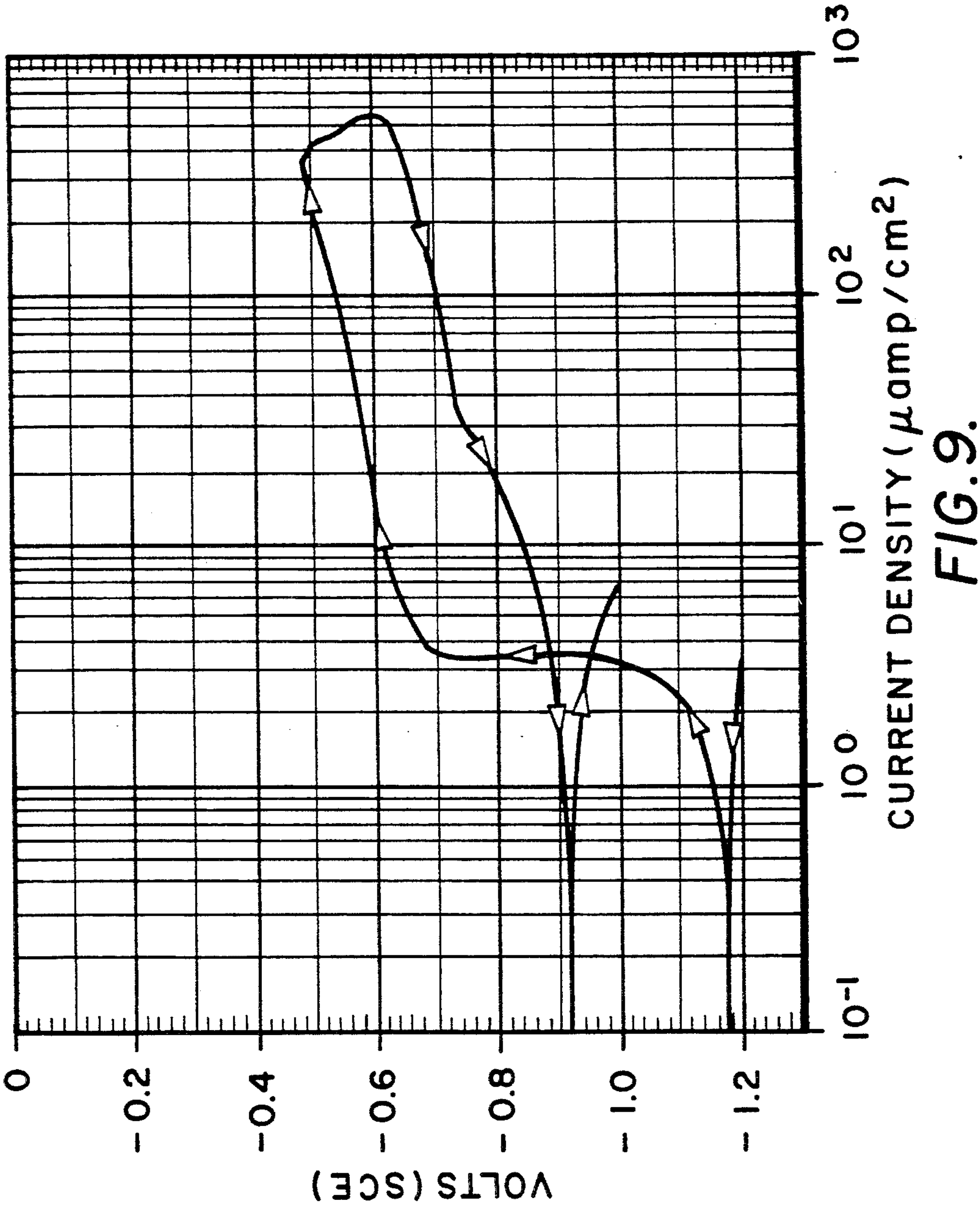
FIG. 9 is a cyclic polarization scan on an annealed Nafion ® coated aluminum coupon, at a pH of 11.

FIG. 9 shows the polarization scan for the annealed Nafion ® coated aluminum coupon immersed in a solution having a pH of 11. The most striking feature was the large decrease in the passive current (between 1 and 2 orders of magnitude). This observation strongly suggested that the coating had significant barrier properties in basic solutions. The decrease in current was believed to be attributed to the inability of hydroxide ions to penetrate to the aluminum surface. Once again, there was a break in the polarization scan suggestive of a pitting potential though no pits were observed on the sample at the end of the polarization scan corresponding to FIG. 9.

Though not wishing to be bound to any particular theory, a possible reason for the presence of a pitting potential when the aluminum coupon was coated with the annealed Nafion ® coating which apparently completely rejected chloride ions is the fact that the corrosion of the aluminum metal below the coating is not zero in neutral or basic pH. Increase in the potential will increase the formation of positive aluminum containing ions. The diffusion of these ions would be restricted somewhat resulting in an increase of their concentration near the metal surface. During the reverse scan, their concentration could be higher than during the forward scan, at least until the rate of formation of such ions becomes less than their rate of diffusion through the membrane. This mechanism would mean that the local environment may be different during forward and reverse scans in neutral and basic pH. A smoother increase in current when the coating is present also supports this hypothosis because a true chloride induce pitting potential would be sharp as in FIG. 6. The absence of attack shown on the coated samples supports this hypothesis as well. Thus, it would appear that if the Nafion ® coating is applied to a fully anodized aluminum surface (such as that obtained by treating aluminum by low-temperature oxidation) and if the casting and annealing of the coating does not destroy this anodization, the pitting potential would probably disappear in neutral and alkaline pH.

An estimate was made of the increase in resistance caused by the Nafion ® coating by the electrochemical impedance technique of Example 3. Assuming that the distance between the Luggin capillary and the electrode surface was the same in all cases, the resistance increased from about 3.5 ohm-cm$^2$ in the case of no coating to about 14 to 15 ohm-cm$^2$ in the presence of the coating. Such small increases in resistance could not account for the significant change in the polarization scans.

As importantly, there was a significant change in the polarization resistance. In the present of the annealed coating, the polarization resistance was about 700,000 ohm-cm$^2$ to about 800,000 ohm-cm$^2$ at a pH of 7. The value seemed to increase with exposure time. This resistance was obtained by assuming a simple model consisting of a parallel RC (resistor-capacitor) circuit in series with the uncompensated resistance. This model circuit fitted the data very nicely. The polarization resistance in the absence of the coating was about 25,000 ohm-cm$^2$ as estimated by the same circuit. This model circuit fitted the higher frequency data but a deviation occurred at lower frequency. One hypothosis was that the deviation was a diffusional contribution in the static set up. The important point, however, was that the coating caused the polarization resistance to increase and the crevice corrosion rate to decrease significantly at neutral and alkaline pH.

EXAMPLE 5

Substrate Effect

In this example, wide-angle X-ray diffraction (WAXD) analyses were performed on cast films upon various substrates in both the non-annealed and annealed forms. Various substrates utilized herein were Teflon, aluminum, stainless steel (316ss) and iridium dioxide on aluminum. An extruded membrane of the perfluorocarbon copolymer was utilized as a control. Each of the substrates were coated with the Nafion ® copolymer coating as utilized in Example 1 and the annealed samples were annealed as in the procedure of Example 1.

Wide angle X-ray diffraction analyses of the specimens herein were performed on two different apparatus. Some of the samples were analyzed using a GE XRD6 diffractometer at 50 kV 30 mA in the transmission mode. When the diffraction was recorded as a function of angle in the transmission mode, the beam of photons of characteristic wavelength (Cu K-alpha=1.5418 Angstroms) was normal to the sample, and the pattern was recorded on the exit side of the sample. These scans were done at 0.2° per minute increments by using Soller Slits and a scintillation counter detector. The intensity was recorded as counts per second as a function of angle. The recorded intensity was corrected for instrument background, sample polarization, and thermal density background.

Some of the samples were analyzed using a Rigaku-Denki rotating anode Cu K-alpha generator at 40 kV 50 mA in the reflection mode. When the diffraction was recorded as a function of angle in the reflection mode, the photon beam was incident to the sample at an angle Theta and recorded at an angle Theta on the reflection side of the sample opposite the photon beam source. Again, the generated spectra were recorded in counts per second as a function of angle, but the spectra were not background corrected.

Some of the samples were analyzed using the GE XRD6 diffractometer at 30 kV 25 mA in the reflection mode.

The results of the wide-angle X-ray diffraction analyses are shown in Table 3.

TABLE 3

| | WAXD d-Spacings (Angstroms) | | | | | |
|---|---|---|---|---|---|---|
| | | Substrate | | | | |
| Annealed | Control Extruded Membrane[a] | Teflon[a] | 316ss[a] | Aluminum[a] | $IrO_2$ on Aluminum[b] #1 | $IrO_2$ on Aluminum[b] #2 |
| No | 5.16 | 5.16 | (4.77) | 5.08 | 5.15 | — |
| | | | | | 2.94 | |
| | | | | | 2.66 | |
| | | | | | 1.76 | |
| | | | | | 1.59 | |
| Yes | 5.07 (4.98) | 5.07 | (5.15) | 5.08 (5.00) | 5.15 | 5.04 |
| | | | (4.77) | 4.22 (3.10) | 3.22 | 3.21 |
| | | | | 3.82 (2.83) | 2.59 | 2.30 |
| | | | | 2.84 (2.50) | 1.75 | |
| | | | | | 1.58 | |

[a]d-spacings outside parenthesis obtained using GE XRD6 diffractometer in transmission mode. d-spacing inside parenthesis obtained using Rigaku-Denki diffractometer in reflection mode.
[b]d-spacings obtained using GE XRD6 diffractometer in reflection mode.

The wide-angle X-ray diffraction analyses of such cast films indicated that in a non-annealed state or form the films and coatings have no long range order and have small randomly ordered lamellar crystallites in some cases, and larger, more well ordered lamellar crystallites in other cases. However when these films were annealed on their respective substrate, they developed thicker crystallites and long range order, as shown by wide-angle X-ray diffraction. However, the structure was dependent on the particular substrate. In the case of metal substrates, it is believed that the mechanism involved interaction of the substrate surface with the sulfonate or carboxylate functional groups in the perfluorocarbon copolymer, e.g., sulfonic acid functionality, upon annealing which leads to a lowering of the micellar surface tension and allows the particles to coat the surface. When comparing the Intensity vs. 2 Theta spectra generated by the WAXD analysis of the non-annealed and annealed Nafion ® membrane and the non-annealed Nafion ® coating on aluminum to the annealed Nafion ® coating or aluminum, the first three samples contained broad diffraction peaks indicative of poorly crystalline polymers having variability in chain to chain length. However, the Nafion ® polymer cast on aluminum was already as ordered as the annealed extruded membrane (see d-spacings in Table 3). From this, it was concluded that the aluminum surface was promoting chain order in the Nafion ® polymer. When the Nafion ® coating on aluminum was annealed, long range order developed as indicated by multiple diffraction peaks in the generated spectra with the corresponding d-spacings tabulated in Table 3.

Stainless steel (316ss) samples were also studied. These samples were prepared in the same manner as those utilized in Example 1. The WAXD spectra generated for the non-annealed Nafion ® coated sample (not corrected for background and other factors) showed one dominant peak (at 18.6°) not associated with stainless steel. The WAXD spectra generated for the annealed Nafion ® coated sample (not corrected for background and other factors) showed two peaks not associated with stainless steel—the dominant peak at 18.6° and a shoulder peak to the left of dominant peak. The shoulder peak (d-spacing of 5.15 Angstroms) corresponds to the Nafion ® polymer and the dominant peak (d-spacing of 4.77 Angstroms) can be correlated with spectra exhibited by $Na_xCr_yO_z$, $Ni_xCr_yO_z$ (where x, y and z integers) compounds. Clearly, the sodium salt of the Nafion ® polymer (originally in acid form) had interacted with the stainless steel surface to form a new complex prior to the annealing process. This new complex persisted even when some of the sodium salt of the Nafion ® polymer had been converted by the annealing process into a structure corresponding to the semi-crystalline Nafion ® polymer structure.

As for metal oxides, upon drying and to a limited extent then upon annealing to a more complete extent the metal oxide reacted with the sulfonic acid so that the metal ion replaces hydrogen ion to form the metal sulfonate and water was evolved. This mechanism was supported by the detection of metal atoms on the surface and throughout the thickness of the polymer coating, both before and after annealing, as shown by Rutherford back scattering analyses. Additionally, the crystallinity of the metal oxide played a role in the development of thicker crystallites and long range order in the Nafion ® coating. The Iridium Oxide in sample 2 was less crystalline than that in sample 1 as evidenced in the generated WAXD spectra thereof wherein the spectra of sample 2 had broader diffraction peaks and fewer diffraction peaks (see number of corresponding d-spacings in Table 3 as between sample 1 and 2). Thus, the less crystalline Iridium Oxide (sample 2) had a less ordered structure than that cast on the more crystalline substrate (sample 2).

When the substrate is a semicrystalline, non-polar material, for example Teflon, it is believed that the mechanism was to invert the solution micelles so that the PTFE (polytetrafluoroethylene) backbone coats the surface. In such an inverted micellar state, this greatly reduces surface tension and prevents premature gel formation. Upon annealing, wide-angle X-ray diffraction indicated thickening of the lamellar crystals and development of long range order in these materials. Of particular note, the wide-angle X-ray diffraction d-spacings of the non-annealed and annealed copolymers were interestingly the same for both the extruded membrane and the copolymer cast on Teflon as is readily apparent in Table 3. However, per the generated WAXD spectra thereof (Intensity vs. 2 Theta), a substrate effect was still quite apparent from the change or increase in intensity observed by the solution cast film over the extruded membrane whether they were non-annealed or annealed.

It will be apparent from the foregoing that many other variations and modifications may be made in the methods and the compositions herein before described, by those having experience in this technology, without departing from the concept of the present invention. Accordingly, it should be clearly understood that the methods and compositions referred to herein in the foregoing description are illustrative only and are not intended to have any limitations on the scope of the invention.

What is claimed is:

1. An article resistant to localized corrosion resulting from anionic attack thereof, said article comprising:

a metal substrate, said substrate comprising a metal selected from the group consisting of passive metals and alloys containing at least one of said passive metals, and a coating of a perfluorocarbon copolymer cation-exchange polymer over said metal substrate wherein said coating has been annealed to effect a morphological change therein such that the rejection of hostile or interfering anions by said copolymer is improved, said perfluorocarbon copolymer cation-exchange polymer comprising a base copolymer which has been hydrolyzed and/or neutralized to its acid or salt thereof, said base copolymer comprising at least two monomers wherein one monomer is selected from a group consisting of vinyl fluoride, vinylidene fluoride, hexafluoropropylene, trifluoroethylene, chlorotrifluoroethylene, perfluoro-(alkyl vinyl ether), tetrafluoroethylene and mixtures thereof, and a second monomer is selected from the group of monomers containing an $-SO_2F$ or $-COF$ group.

2. The article according to claim 1 wherein said passive metal is selected from the group consisting of aluminum, chromium, iron, nickel and metal alloys containing at least one of said aluminum, chromium, iron and nickel.

3. The article according to claim 1 wherein said hostile or interfering anions are chloride, bromide, fluoride, perchlorate, thiocyanate, nitrate and nitrite ions.

* * * * *